United States Patent [19]

Dempsey

[11] Patent Number: 5,762,405
[45] Date of Patent: Jun. 9, 1998

[54] SHEAR BONDED MOLDED WHEEL ASSEMBLY

[76] Inventor: Douglas E. Dempsey, 6208 Felspar Ct., Bellvue, Colo. 80512

[21] Appl. No.: 724,070

[22] Filed: Sep. 30, 1996

Related U.S. Application Data

[63] Continuation of Ser. No. 306,780, Sep. 15, 1994, abandoned.
[51] Int. Cl.$^6$ ........................................................ B60B 5/02
[52] U.S. Cl. ............................................. 301/64.2; 301/64.7
[58] Field of Search ........................... 301/64.1, 64.2, 301/64.3, 64.4, 64.5, 64.7, 95, 96, 97, 98

[56] References Cited

U.S. PATENT DOCUMENTS

| | | | |
|---|---|---|---|
| 3,656,531 | 4/1972 | Ross et al. | 301/63 |
| 3,695,728 | 10/1972 | Haussels | 301/63 |
| 3,695,729 | 10/1972 | Schwerdhofer | 301/63 |
| 3,862,779 | 1/1975 | Jayne | 301/63 |
| 3,998,457 | 12/1976 | Dempsey et al. | 273/73 |
| 4,043,603 | 8/1977 | Bergmann et al. | 301/63 |
| 4,114,953 | 9/1978 | Baumgartner | 301/63 |
| 4,252,378 | 2/1981 | DeBolt et al. | 301/63 |
| 4,344,655 | 8/1982 | Pellegrino | 301/2.5 |
| 4,358,162 | 11/1982 | Schneider et al. | 301/63 |
| 4,376,554 | 3/1983 | Schumacher | 301/63 |
| 4,511,184 | 4/1985 | Schauf et al. | 301/63 |
| 4,527,839 | 7/1985 | Fujitaka et al. | 301/63 |
| 4,530,543 | 7/1985 | Keane | 301/63 |
| 4,580,846 | 4/1986 | Johnson et al. | 301/63 |
| 4,639,046 | 1/1987 | Oleff et al. | 301/63 |
| 4,732,428 | 3/1988 | Monte | 301/63 |
| 4,793,659 | 12/1988 | Oleff et al. | 301/63 |
| 4,818,034 | 4/1989 | Djerf | 301/63 |
| 4,835,857 | 6/1989 | Michelotti | 29/159 |
| 4,844,552 | 7/1989 | Tsygankov et al. | 301/63 |
| 4,919,490 | 4/1990 | Hopkins et al. | 301/63 |
| 4,995,675 | 2/1991 | Tsai | 301/63 |
| 5,018,795 | 5/1991 | Engerand et al. | 301/63 |
| 5,022,712 | 6/1991 | Woelfel et al. | 301/63 |
| 5,104,198 | 4/1992 | Prout et al. | 301/63 |
| 5,104,199 | 4/1992 | Schlanger | 301/63 |
| 5,104,200 | 4/1992 | Prout et al. | 301/63 |
| 5,133,591 | 7/1992 | Skaggs et al. | 301/63 |
| 5,174,633 | 12/1992 | Kidd et al. | 301/64.7 |
| 5,184,874 | 2/1993 | Olson et al. | 301/64.7 |
| 5,229,047 | 7/1993 | Becker | 264/45.7 |
| 5,234,259 | 8/1993 | Nishimuro et al. | 301/64 |
| 5,246,275 | 9/1993 | Arredondo | 301/64.7 |
| 5,268,139 | 12/1993 | Sheeler | 264/328.8 |
| 5,338,611 | 8/1994 | Lause et al. | 428/412 |
| 5,344,219 | 9/1994 | Adrian et al. | 301/64.1 |

FOREIGN PATENT DOCUMENTS

| | | | |
|---|---|---|---|
| 2380904 | 9/1978 | France | B60B 3/08 |
| 2485445 | 12/1981 | France | B60B 5/02 |
| 3315123A1 | 10/1984 | Germany | B60B 19/00 |
| 2153757A | 8/1985 | United Kingdom | B60C 7/24 |
| 2229975A | 10/1990 | United Kingdom . | |

OTHER PUBLICATIONS

Emaweld, Emabond Systems, Ashland Chemical Company, Copyright 1987 Listed.
Head Wind, What Headwind?, Innovations in Composites, Inc., unknown publication date.

*Primary Examiner*—Russell D. Stormer
*Attorney, Agent, or Firm*—Santangelo Law Offices, P.C.

[57] ABSTRACT

A molded wheel design may incorporate identical halves and a shear bond to allow efficient manufacturing and assembly. The wheel design which may be applied in a host of different applications including a bicycle wheel where demanding loads exist in normal use. Integral bearings, foam tire adaptations, symmetrically opposite designs, and compression bonding techniques are described. A host of bonding techniques including the use of electromagnetically active material are accommodated by the designs. Spacers in the vicinity of the hub portion and semicircular boundaries so as to define a valve stem hole after assembly can be included.

22 Claims, 12 Drawing Sheets

SHEAR BONDED MOLDED WHEEL ASSEMBLY

This is a continuation of application Ser. No. 08/306,780 filed Sep. 15, 1994, and now abandoned.

BACKGROUND OF THE INVENTION

This invention relates generally to molded wheel designs which join two halves together in order to form a single wheel. Specifically, the invention focuses upon wheel assembles which are efficient to manufacture and assemble, and yet which also have structural integrity similar to that of traditional spoke designs and wheel designs which are molded from one single piece.

Obviously, the wheel has been around for some time; it may even be considered the most fundamental invention of mankind. In spite of this history, the wheel is still the subject of continued improvement. These improvements are not merely efforts to "reinvent the wheel", they are actually incremental improvements which specifically adapt the wheel to different applications and make it more efficient for the end consumer. One of these fields, that of application to bicycles has also been known for years. This field is perhaps the one which is most subject to efforts at improved efficiency, be it in use, manufacture, or otherwise. Such improvements relate to the adaptations of new understandings and technologies in a manner which allows more efficient manufacture and utilization of such a well known item.

One of the more recent technologies which has been adapted for bicycle wheel applications, is the technology of molding wheels. Improvements in this area have been fundamentally motivated by a pervasive desire to improve the efficiency with which such bicycle wheels are manufactured and yet maintain light weight.

The traditional bicycle wheel design involves a metal hub portion and a metal rim portion which are connected through numerous spokes. These spokes are usually each hand assembled and adjusted to achieve a perfectly circular and axially true wheel. The labor intense nature of such traditional spoke designs is one aspect which has great impact upon the cost of bicycle wheels. Obviously, by creating a design which is molded this significant cost impact can be avoided.

In spite of the rather obvious advantage of applying molding technology to this field, the technical challenges incidental to producing a molded wheel design have greatly limited the commercial acceptance of molded bicycle wheel designs in general. One of these challenges is the need to maintain light weight and yet strong structure. On the one hand, solid designs require structure to be located near the central axis. This can limit the structural characteristics. By analogy to I-beam construction, it can be more efficient to move structure off the axis, but this does not lend itself to the most simple molding processes. One the other hand, molding is more challenging for hollow items so moving structure off the axis can cause increased weight. Surprisingly, these and other technological hurdles have caused structural challenges for the field of bicycle wheels as its applications are actually one of the more demanding. Perhaps paradoxically, the challenges of applying molding technology have even lead toward increased expense for some designs.

Structurally, molded wheel designs have been faced with the challenge of allowing for two-part designs which can be joined together in a fashion that can withstand the significant stresses of such applications. In U.S. Pat. No. 4,344,655 to Pellegrino, a two-part molded wheel was disclosed in which the adjoining halves are held together through barbed designs which are molded as an integral part of each wheel half. While such a technique for joining the halves might work in low-stress applications such as the children's design as shown in that patent, singular fastening devices such as the barbs have an undesirable incident of concentrating stresses when the wheel is in use. Since the materials frequently used in molding items are not preferably materials which are particularly strong, this concentration of stresses has to some extent limited applications to items such as children's vehicles and the like.

Since these structural challenges are well known, several incremental improvements in more demanding applications such as the bicycle or motorcycle wheel have, of course, been proposed. In U.S. Pat. No. 4,527,839 in Fujitaka, it was proposed that a molded wheel be designed so as to be joined together through the use of both bonding and external fasteners. While for some designs such a technique might actually achieve sufficient structural integrity, obviously the assembly required for such designs degrades the efficiency which is a supposed hallmark of molded wheel designs in the first place. In addition, through its combination of bonding and fastening in order to join the two halves, the Fujitaka reference teaches away from the direction of merely bonding alone to join the two halves. Another challenge to joining wheel halves together was addressed in part in U.S. Pat. No. 3,695,728 to Haussels. In that patent, it was disclosed that the stresses near the center of the rim portion of the wheel are particularly acute. In order to deal with such stresses, the Haussels disclosure—again eschewing a bonded design—suggested placement of barb fasteners off the central plane to reduce forces. Among other aspects, this design represents not only a direction away from that taken by the present invention, but it is also an example of the seemingly narrow incremental improvements which are considered important when applied to such an invention which is as basic as the wheel.

Perhaps an even more extreme example of the challenging nature of joining two wheel halves together is demonstrated by a molded wheel design entitled "SPIN" by Innovations and Composites, Inc. This design (characterized by its inventors as "reinventing the wheel") goes to great lengths to avoid the two-part molded concept. Instead, it discloses a single-piece molded design in which the hollow wheel is created through use of a lost core molding process, a process in which the core is melted out of the product after it has been molded. Although such a design does overcome the challenge of properly joining two or more parts together, it fails to achieve the most important goal of manufacturing efficiency. In fact the process is so expensive that the end wheel is significantly more expensive than traditional, albeit inefficient, spoke designs. obviously, this direction does not achieve the low cost manufacturing efficiencies which are considered to be the hallmark of many molded wheel designs.

As the prior efforts demonstrate, although molded wheel designs have been known for over twenty years, and although there has long been an unsatisfied need for a satisfactory molded wheel design, until the present invention, such a design has not existed. For years, those skilled in the art have sought a molded wheel design which has been sufficiently easy and inexpensive to manufacture and assemble and which was also capable of satisfying the demanding structural needs of applications such as the bicycle field. Perhaps surprising in this regard is the fact that while the present invention merely implements arts which have long been available, until the present invention, those skilled in the art have not recognized the fact these could be implemented in a manner which would achieve these long felt needs. This was perhaps due to several factors. First, the attempts by those skilled in the art were directed away from designing the bond and wheel in a manner which was structurally appropriate. In some regards, they simply seemed to accept that bonding alone would not represent an adequate approach and may have even failed to understand that the problem lay in properly designing the wheel, not in applying different technologies. This may even have been fostered by the directions and teachings taken by some (such as those involved with the references discussed above) which were away from the directions taken in the present invention.

SUMMARY OF THE INVENTION

Accordingly, the present invention provides molded wheel assembly designs in which two or more portions can be molded and joined together in a manner which is both efficient from a manufacturing perspective and structurally sound under demanding applications. The designs may involve two halves which may be identical and which may be shear bonded together through the use of specifically designed flanges and recesses which allow the bonding to be perpendicular to the central plane. In some embodiments, this bonding is designed so as to increase the bonding area. This can increase the structural integrity of the bond for areas of particular stress. Further, the designs may incorporate wheel halves which may act to achieve compression between the surfaces during the joining process. These designs can thus achieve a more structurally sound bond without any need for external assembly involvement. The designs may also include integral bearings, integral molded valve stem holes, and even valve stem access areas to avoid any need for drilling or other manufacturing steps.

It is one general goal of the invention to provide for a variety of wheel designs which can be efficiently manufactured. In keeping with this goal, an object is to allow for identical halves to be molded and assembled. It is also an object to provide designs for which structural enhancements can be incorporated at varying locations. These structural enhancements may include additional internal ribs as well as the inclusion of injected or inserted fibers at areas of particular stress.

Another general goal of the invention is to provide wheel assembly designs which can withstand the stresses incident to demanding use. It is an object to provide for designs in which the strengths of the particular resultant bond can be adjusted throughout the wheel assembly. Another object is, of course, to provide for an exceptionally strong bond between two molded halves of a the wheel assembly. This object includes the creation of a shear bond which may be optimally configured to resist the stresses incidental to demanding uses.

Yet another general goal of the invention is to provide for methods and designs which minimize the amount of labor required in the assembly process. In keeping with this goal, one object is to allow for designs in which the two halves may be joined only through bonding techniques to minimize additional assembly steps. Similarly, an object is to allow for wheel assembly designs which include a hole for a valve stem or the like and yet which do not require a separate drilling step. Yet another object in keeping with this general goal is to allow for techniques through which molded designs may be bonded together in a automated fashion. One example of this includes the object of utilizing electromagnetic bonding technology. In keeping with the general goal of minimizing assembly labor, the invention also has as an object allowing for integral components such as bearings or spacers. This may also include the incorporation of integral cosmetics and the like so that once joined, the wheel assembly is substantially complete.

Yet another general goal of the invention is to provide for a design which can be adapted based upon the particular requirements of the many varying applications which are possible. In keeping with this goal, an object is to allow for both the increase or decrease in bonding area throughout various portions of the wheel and from one wheel design to another. This allows for more efficient designs and assembly. Yet another object in keeping with this general goal is to provide for designs which can adapt and utilize polyurethane and other tire materials in a most efficient manner.

Naturally, further objects of the invention are disclosed throughout other areas of the specification and claims.

BRIEF DESCRIPTIONS OF THE DRAWINGS

DETAILED DESCRIPTION OF THE PREFERRED EMBODIMENTS

Figure 1A:
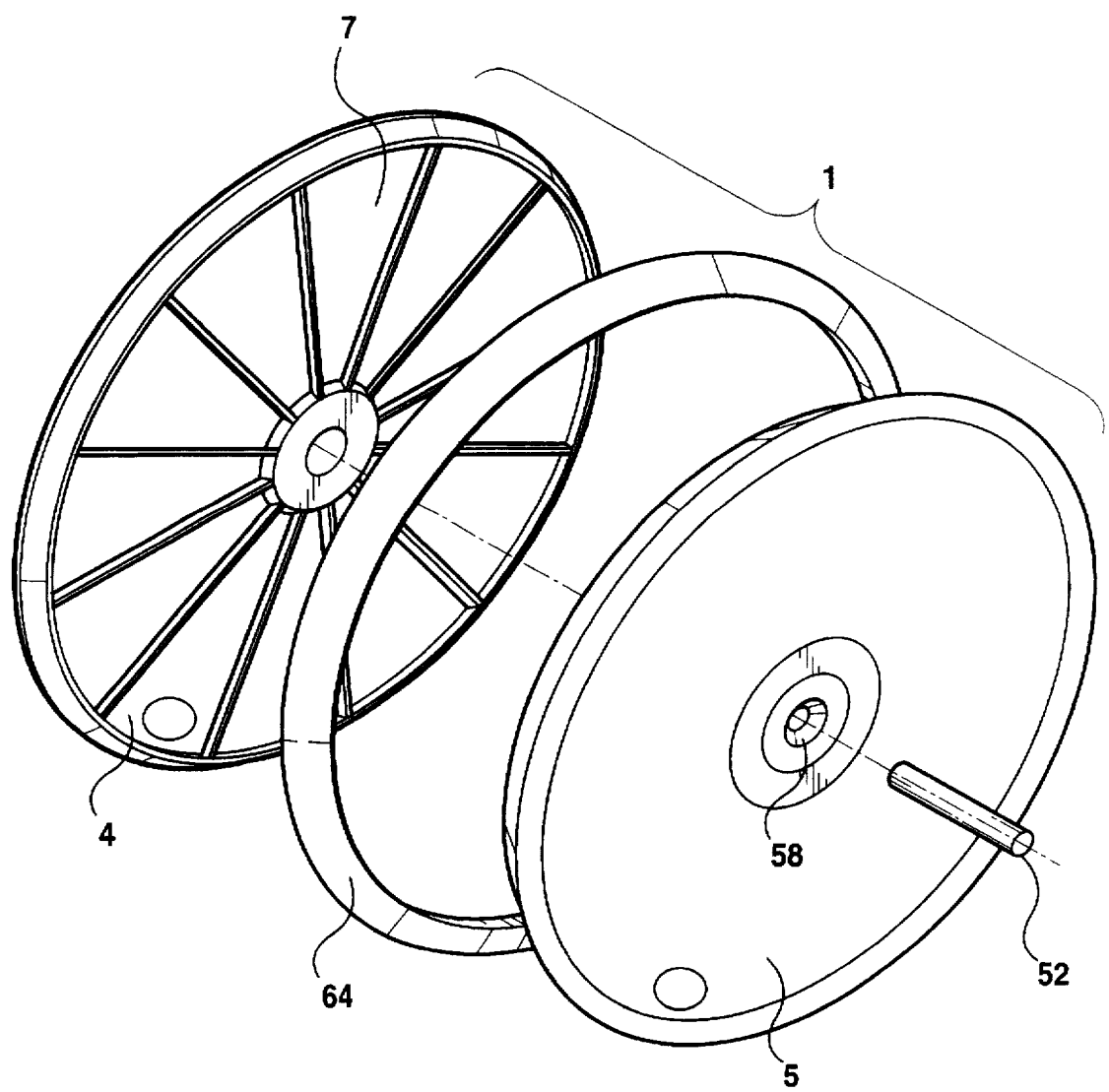
FIG. 1A is an exploded view of one embodiment of a wheel assembly according to the present invention.
Figure 1B:
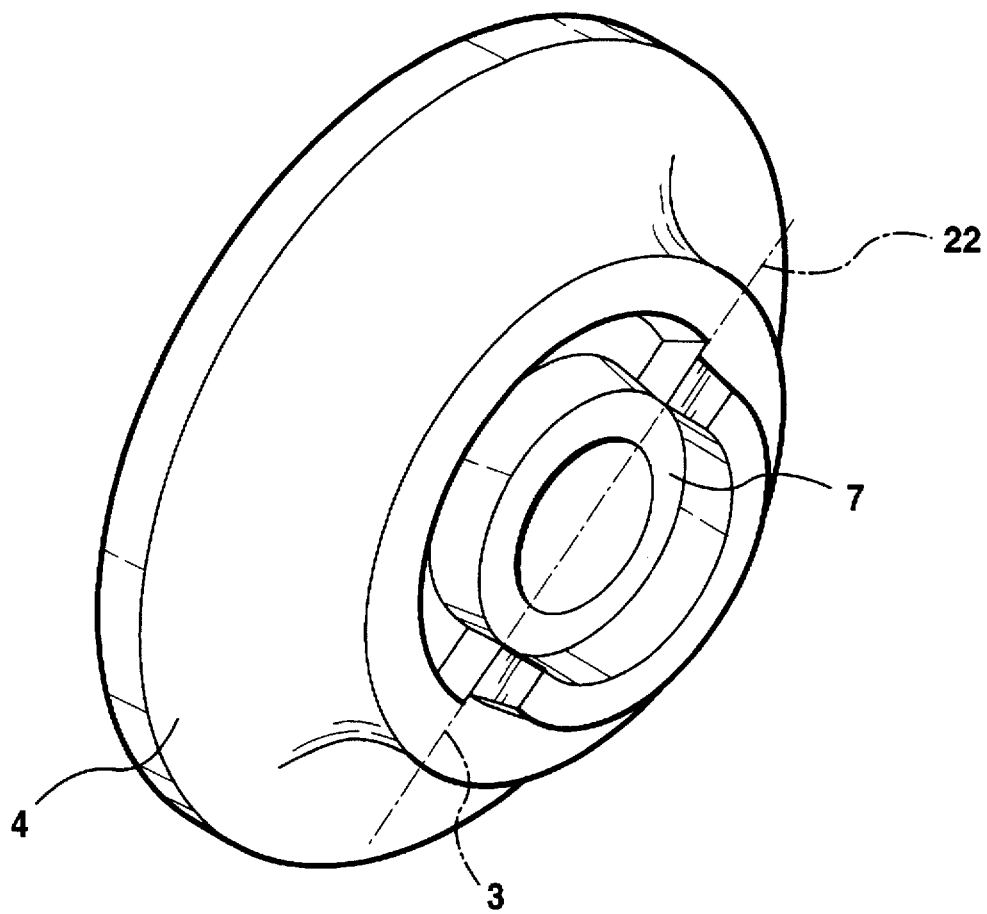
FIG. 1B is an expanded view of the inner hub portion shown in FIG. 1A.

As can be seen from the drawings, the basic concepts of the invention may be adapted in many ways. Referring to FIGS. 1A and 1B, it can be seen that in basic form the invention may involve two identical molded halves which have their interiors (7) configured so as to allow easy assembly. Such a wheel assembly may be molded of a variety of numbers of pieces. When made of two halves, assembly may be completed by simply joining the two halves, shown arbitrarily as first molded portion (4) and second molded portion (5), inserting an axle (52) and placing a tire (and tube) such as conventional tire (64) on the wheel assembly (1). Naturally, the tire and/or tube may be placed either before or after joining the two halves. As shown in cross section in FIG. 2, the entire wheel will exist radially centered around axle (52) and also about a central plane (3).

In keeping with one of the goals of the invention, such a simple assembly is very efficient as all it involves is creating at least the first molded portion (4) and a second molded portion (5) and then simply joining them together for later completion. While the design shown in FIG. 2 consists of only a first and second molded portion (4)&(5), as mentioned earlier it should be understood that any number of molded or other parts may be involved. By selecting only two molded parts, that is first molded portion (4) and second molded portion (5), it is believed that a hollow design such as that shown in FIG. 2 can be easily and efficiently manufactured and assembled.

Figure 2:
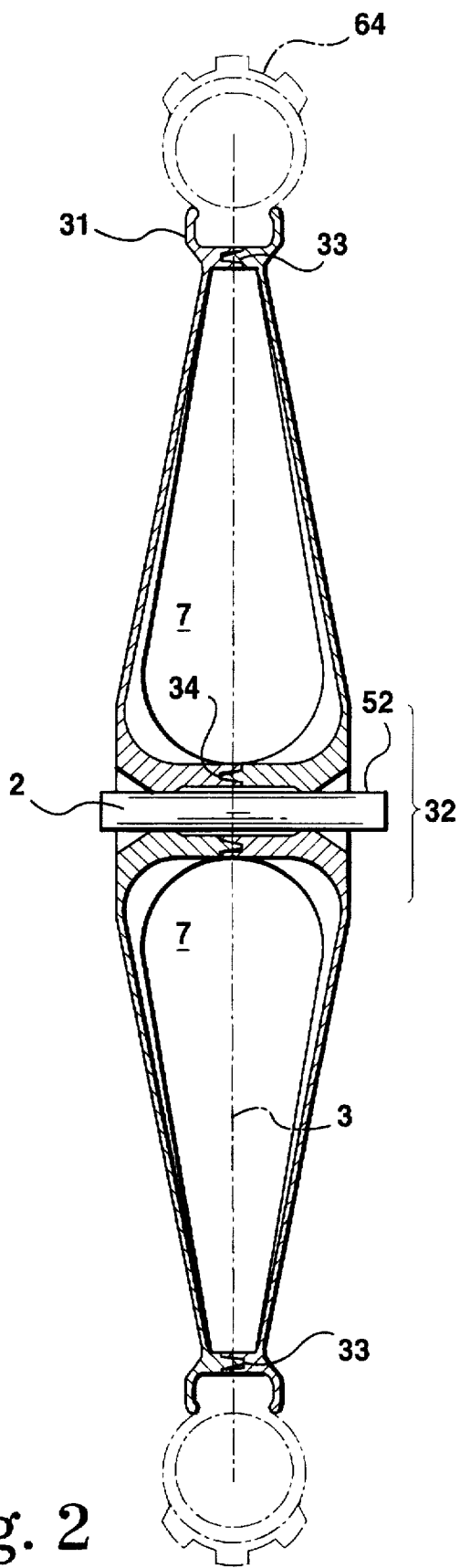
FIG. 2 is a cross sectional view of an assembled wheel similar to that shown in FIG. 1A.

An important component of the invention is how the various molded parts are joined together. While, naturally, certain aspects of the invention may encompass any type of fastening technique, some embodiments are particularly designed to be only bonded together in some fashion. By using the term "bonding" in its most generic sense, the invention encompasses a host of different technologies which essentially join two parts together and hold them together in a manner which does not require a great amount of labor. As can be understood easily from FIG. 2, this may involve bonding together first molded portion (4) and second molded portion (5) so that some type of fastening occurs over most of a bond area. As shown in FIG. 2 this bond area may consist of rim bond (33) radially aligned around central axis (2). It may also include hub bond (34). Such bonds may hold together the various portions of the wheel assembly in a manner which, when joined, creates a wheel assembly which is substantially symmetrical about a central plane (3). By being substantially symmetrical, the wheel design may be basically a mirror image of itself on either side of central plane (3). This can assist in maintaining the proper balance and stress distributions throughout the wheel.

As mentioned earlier, one of the advantages of such a molded wheel design is that the wheel can be easily and inexpensively manufactured when compared to traditional metal spoke designs. This is an important aspect to commercial success for several reasons. First, the capital equipment required to rollform a flat strip of steel in order to create the rim in traditional wheel designs is fairly expensive and extensive. This is compounded by the fact that welding equipment is necessary to butt weld the joint and form the rim in a continuous circle. Further, grinding equipment is also usually necessary to remove excess weld material, not to mention, the hole punching equipment or drilling equipment to create holes for the spokes. Once created, the traditional assembly process of inserting the spokes and properly lacing and tensioning each spoke to assure true lateral and radial runout characteristics are exceedingly expensive. Such highly skilled labor requirements can even account for up to one-third of the total construction cost of a traditional spoke assembly. Obviously, this is a significant cost impact for traditional wheel designs. As mentioned earlier, although this aspect has been well known for years, the challenge of manufacturing and assembling an appropriate molded wheel assembly has to some degree been how to appropriately bond the molded parts and yet create sufficient structural integrity for demanding uses. This is accomplished through a unique shear bonding aspect in the present invention.

As shown in FIG. 2, it can be seen that both first molded portion (4) and second molded portion (5) are designed to fit together and to thus allow bonding in a manner so that the bond is subjected to primarily shear forces. This departs from most of the prior designs and is an aspect which contributes to the significant structural achievements of the invention.

Figure 3:
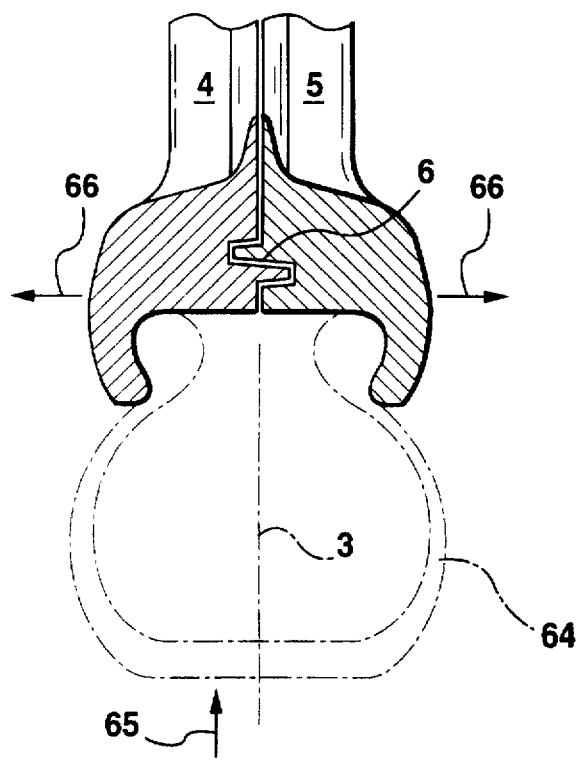
FIG. 3 is a cross sectional view of a rim portion of two parts of a spoked wheel design after being joined together.

As may be appreciated from FIG. 3, when in use, wheel assembly (1) is subjected to a host of forces. This naturally includes the force due to the weight of the vehicle (and often its rider) shown in FIG. 3 as normal force (65). This force is transformed into a tension force (66). Significantly for bonded designs, tension force (66) acts to pull first molded portion (4) and second molded portion (5) apart. These forces are further increased in situations in which wheel assembly (1) is subjected to high speed turns, bumps in the road, and the like. In spite of the fact that this force aspect should be well understood by those having ordinary skill in the art, and in spite of the fact that those skilled in bonding parts together should have well understood that the bond is stronger in shear rather than tension, the prior art designs, if bonded, seemed to focus almost exclusively upon bonds which were subjected to tension loading. Significantly different from these approaches, the present invention takes the approach of creating bonds which are primarily shear loaded.

While in hindsight the aspect of creating a shear loaded bond seems potentially unremarkable, prior to the present invention, those having ordinary skill in this particular art appeared not to have fully appreciated this aspect. As mentioned earlier, they may have also been led away from aspect and may have even misunderstood how to create such a bond. This may have been understandable because, prior to the present invention, the technique of bonding along an interior shear surface may have appeared extremely difficult or even impossible to achieve in a practical and efficient manner. As shown in FIG. 3, the present invention achieves a shear bond (6) along a surface which is substantially perpendicular to the central plane (3). Further, it may be noticed that this shear bond (6) is achieved in the interior of the wheel assembly.

Figure 4:
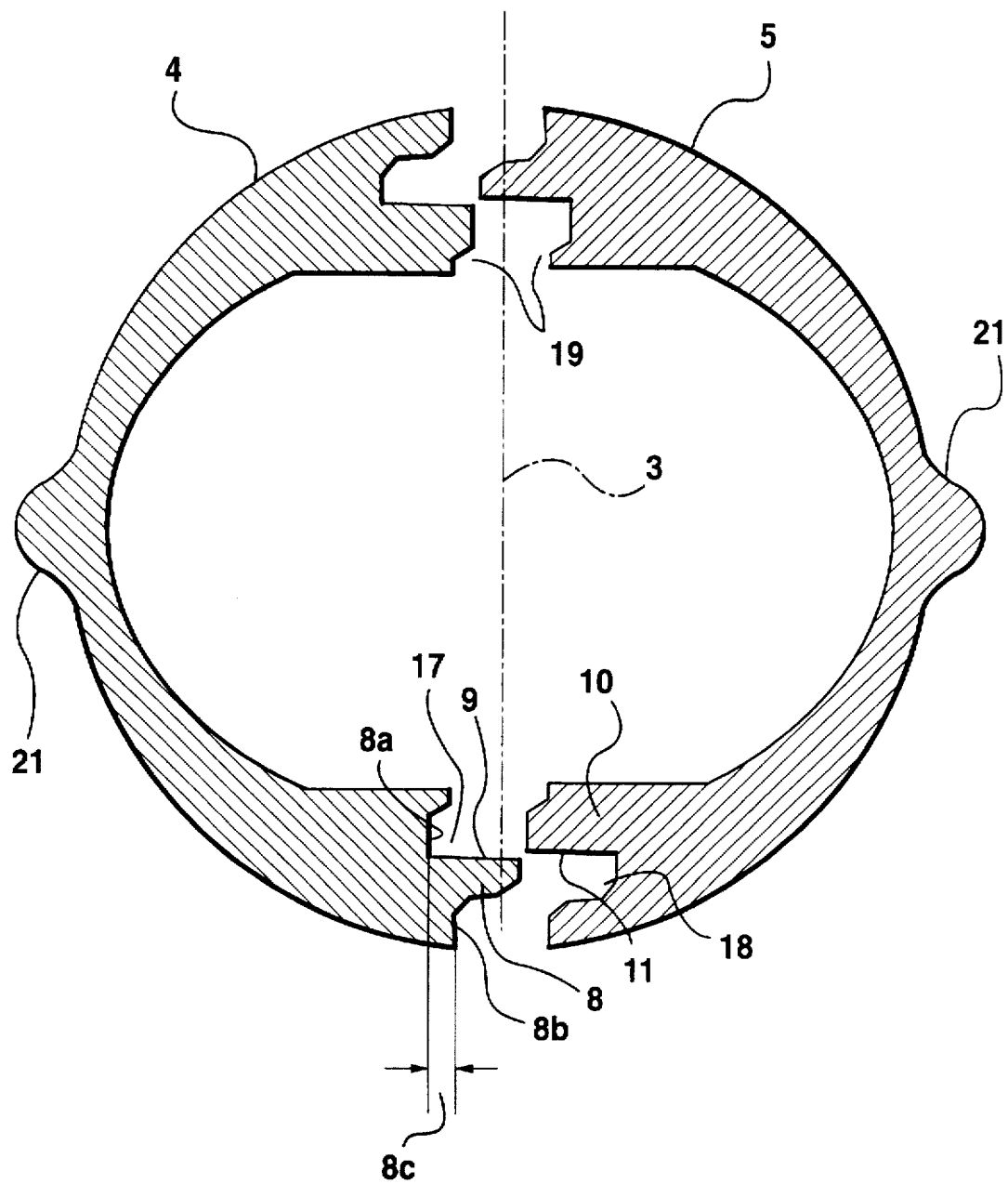
FIG. 4 is a cross sectional view of a spoke portion just prior to assembly and showing recess faces that flank both sides of a flange and which are offset from each other.

Referring to FIG. 4, a cross sectional view of another bond area (in this case a spoke bond, although naturally the various bonding designs may be implemented at any location), it can be easily understood how an interior and perpendicular shear bond is achieved. As shown in this particular design, first molded portion (4) may include first flange (8) which has first bonding surface (9) situated thereupon. Similarly, second molded portion (5) may include second flange (10) having second bonding surface (11) on it. These surfaces and parts are designed to mate with each other in a fashion so that a shear bond is situated between first and second bonding surfaces (9) and (10). As can be seen, first bonding surface (9) and second bonding surface (11) are arranged so as to be substantially perpendicular to the central plane (3). Further, it should be understood that more than one surface may be included. As shown in FIG. 4 this might include the opposite surfaces of first flange (8) and second flange (10) as may be readily appreciated. Notice the recess face 8a of recess 17 and the recess face 8b, below and adjacent to flange 8. The recess faces flank both sides of the flange 8, recede backward from the outward extension of flange 8, and are offset from each other (that is, at unequal distances from the central plane) by a distance 8c.

Unlike some of the teachings of earlier designs, the current design is configured so that the shear bond between first bonding surface (9) and second bonding surface (11) extends across the central plane (3). This has the advantage of supplying force in an area which is particularly subject to stress while simultaneously allowing first molded portion (4) and second molded portion (5) be identical. While naturally the shear bond may be located anywhere, the design shown locates the bond so that it extends across the central plane (3) and is nearly symmetrical with respect to central plane (3). This is accomplished by providing a first recess (17) and a second recess (18) into which first and second flanges (8) and (10) fit.

An advantage of a molded design which is bonded together is the fact that reinforcements can be provided in an optimal manner where required. These reinforcements may consist of internal stiffeners or ribs (21) as shown in FIGS. 15A–E. Other alternatives include internal or external ribs (21) as shown in FIG. 4 and even inserted fibers within the material. While it has been known to utilize short fibers which flow with the material as the molding is occurring, through the designs shown it is possible to incorporate longer fibers through some type of layup or automated procedure. Importantly, the design affords sufficient adjustability to allow for structural enhancement as desired. If on the interior, ribs may even be hidden from view. The design allows variation to achieve weight distribution and savings as may be required for particular applications as well. It also allows such ribs to be located as far from the central plane (3) as possible which can increase the structural characteristics as mentioned earlier.

A particular advantage to the design as shown in FIG. 2 is that both first molded portion (4) and second molded portion (5) may be identical. This allows capital savings in that a single mold may be utilized to create both portions of the wheel. In addition to the economic advantages of such a design, it also addresses some of the challenges often encountered in molding such as uniform shrinkage, uniform material, uniform color, and the like. Importantly, when creating two molded portions to fit together it is important that the interior surfaces of the wheel be designed to fit together at several locations. As shown in FIG. 4, to achieve this the inner surface (19) of each molded portion is designed to be complementary so that they may be joined to create one wheel assembly. The aspect of being complementary encompasses not only the identical designs discussed earlier, but it also includes mirror image designs, and designs which merely fit together such as might be achieved in a male/female snap together arrangement. Naturally, it should be understood that first and second molded portions (4) and (5) need not be identical as this is merely a convenience which might be appropriate for specific designs.

Figure 5:
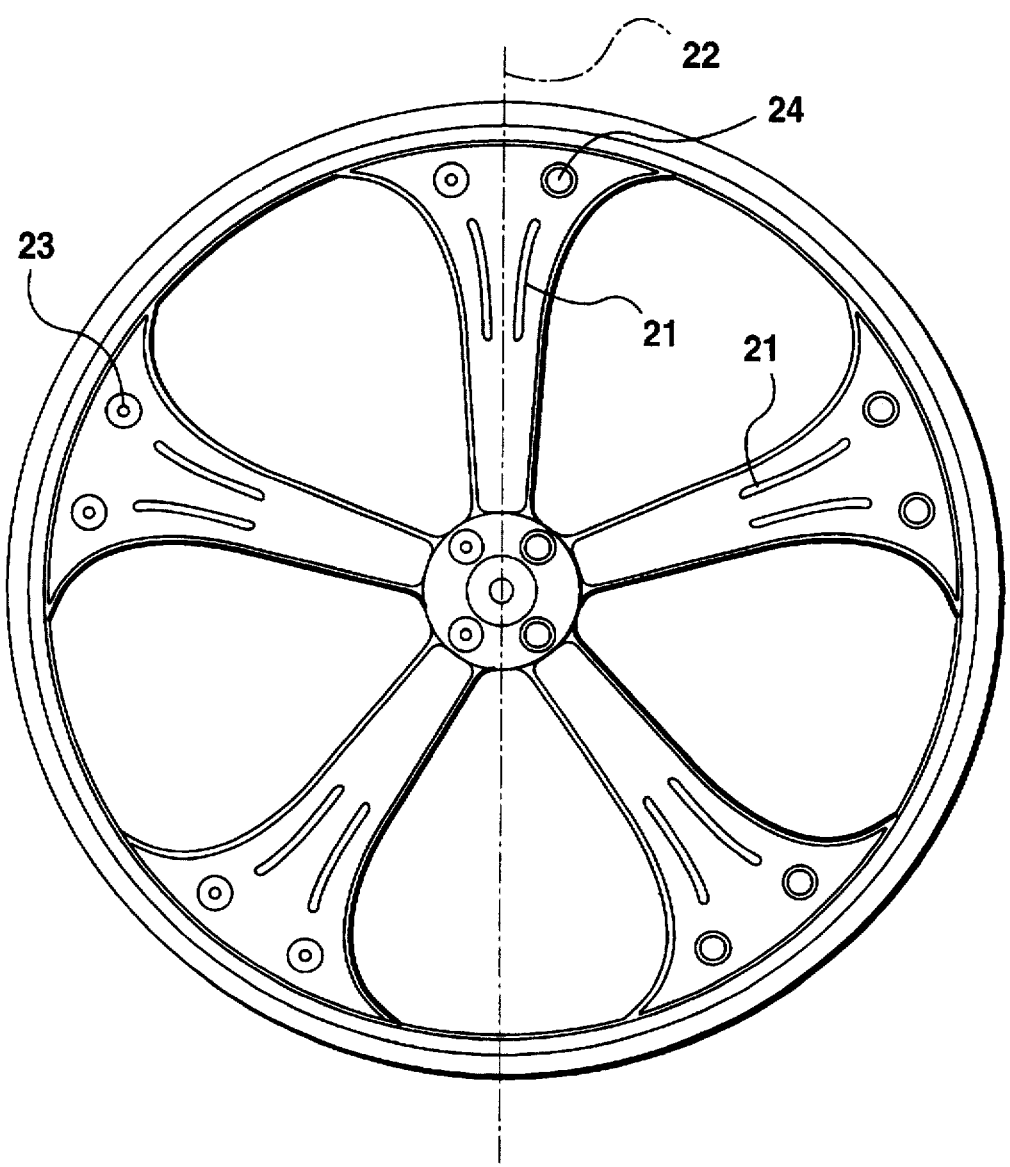
FIG. 5 is an inside view of one half of a spoke design.

In designing parts which are efficient to manufacture, it can also be advantageous that the inner surfaces (19) of such parts be configured in a manner which allows identical parts (or at least identical inner surfaces) to fit together. This aspect of the invention is referred herein as a "symmetrically opposite" design. Such designs can be best understood with reference to FIGS. 5 and 15A which show the inner surfaces of two such parts. First it should be understood that inner surface (19) is defined as those portions of the inside of a molded part which are designed to fit together and join with another molded part. Thus, the design or shape of areas which do not fit together is not considered relevant with respect to the term "inner surface." While all inside surfaces might be truly identical they need not be to understand the concept of symmetrically opposite designs. For some specific designs, this inner surface may be only the portion which extends across the central plane (3). To further understand this aspect, it is also advantageous to define two halves of one molded part by dividing the wheel along some arbitrary axis. This axis, the folding line (22) shown in FIGS. 5 and 15A–D, defines two halves in which inner surfaces (19) are symmetrically opposite images. The concept of symmetrically opposite images may include merely complementary surfaces as shown in FIG. 5. For example, as shown in FIG. 5, while at one location on the part a male part (such as a barb (23)) exists, at a location opposite the folding line (22), a corresponding female part (such as a receptor (24)) exists. Thus, as can be seen in FIG. 5, the portion to the left of folding line (22) includes male and female portions which are reversed—that is, a male portion becomes a female portion and vice a versa—on the portion to the right of folding line (22). Such a design is complementary across the folding line (22).

Truly symmetrically opposite designs may also exist, for instance, for the design shown in FIGS. 15A–E, while at one location on the part a flange exists, at a location opposite the folding line (22), a corresponding recess exists. Thus, as can be seen in FIGS. 15A–D, the portion to the left of folding line (22) includes flanges and recesses which are reversed—that is a flange becomes a recess and vice a versa—on the portion to the right of folding line (22). In this way, the inner surfaces are truly "symmetrically opposite" images. They will also fit together in a complementary fashion when a second, identical piece is molded. Further, the parts may be merely complementary. Thus, while flanges and recesses are shown (the symmetrically opposite designs), male and female portions (the broader designation appropriate for both flanges and recesses which also encompasses other types of complementary designs) may also be possible.

This can be further understood with reference to a design such as that shown in U.S. Pat. No. 4,344,655 which shows barbs, the male portion and corresponding receptors, the female portion. By designing the first male portion to fit within a first female portion in a fashion in which the designs are symmetrically opposite, a wheel assembly can be achieved through a single molded part. Naturally, these features may be integral to the molded wheel assembly and may be situated to fit within each other at locations where the stresses seem to be concentrated the most for the particular application.

Figure 6:
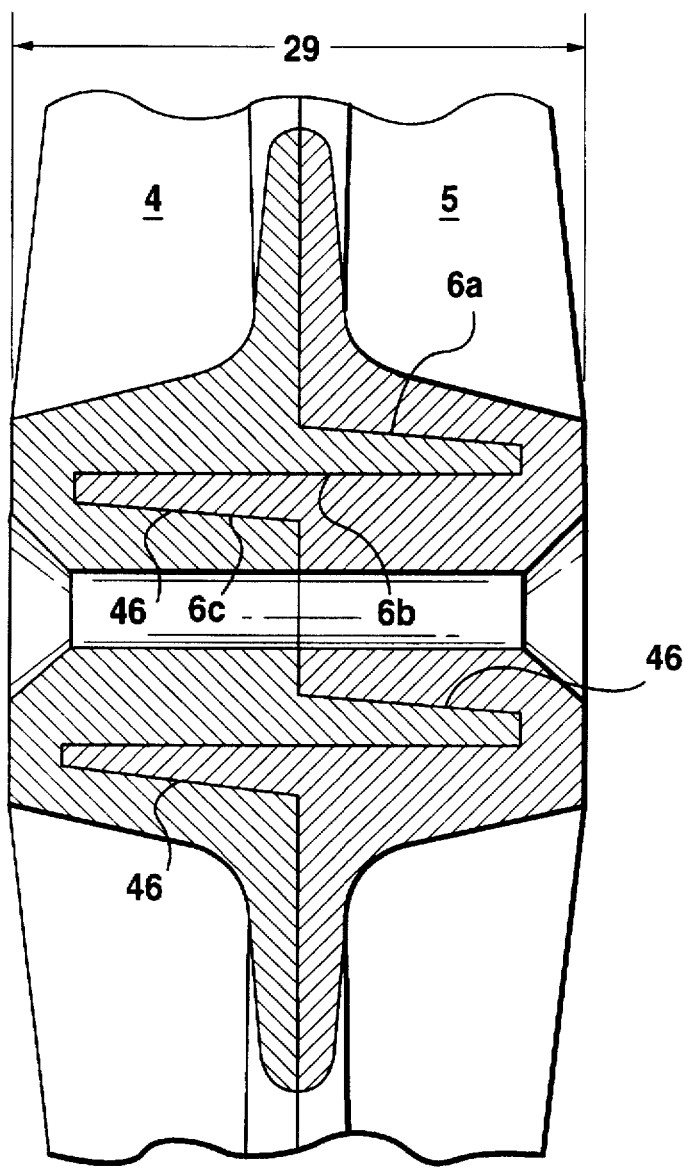
FIG. 6 is a cross sectional view of a different hub portion design after assembly.

Referring to FIG. 6, another type of bonding design, it can be understood how the entire width of shear bond (6) can actually exceed the total width (29) of the wheel in the vicinity of the shear bond. As can be easily understood, through the designs shown in FIGS. 6 and 7, the shear bond may exist at location (6a), (6b), and (6c) or along surfaces (13) and (15). When added together, each of these areas present a width which may effectively exceed the width (29) of the wheel in the vicinity of the shear bond (6). This is shown with symmetrically opposite images but need not be so limited as can be readily appreciated.

Figure 7:
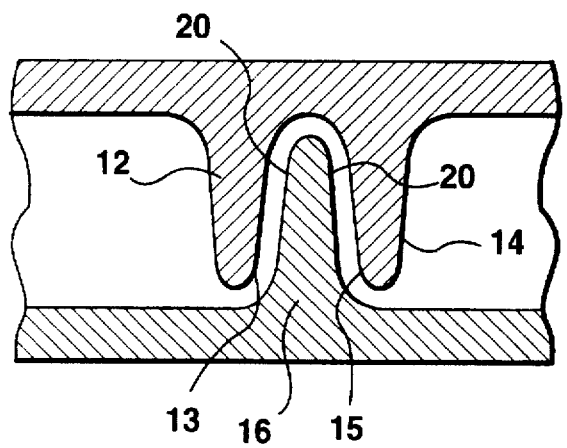
FIG. 7 is a cross sectional view of yet another design showing a bonded area.

In addition to the techniques shown in FIG. 6, it is also possible to extend the width of shear bond—and thus the strength of the shear bond—through alternative designs. One such alternative design is shown in FIG. 7. Naturally, it should be understood that all bonding techniques can be used at any location. As shown, the design may incorporate left flange (12) which includes left bonding surface (13). Integral to the same part might also exist right flange (14) with corresponding right bonding surface (15). These bonding surfaces might face each other and define a recess into which center flange (16) might be inserted. They may also be positioned apart for adhesive bonding and the like or literally touching each other for solvent bonding and the like. As shown, the center bonding surfaces (20) of center flange (16) are positioned to join with both left bonding surface (13) and right bonding surface (15). In this fashion, enhanced structural strength and bonding area can be achieved. Such variations in design (as well as the other variations shown allow for an adjustable bond design.

In addition to the particular type of bonds, the bonds can be located at any desirable portion for further variability. As shown in FIG. 2, rim bond (33) located in rim portion (31) can be used with or without hub bond (34) located in hub portion (32). In addition, spoke bonds can be included along a plurality of spoke portions as well. These bonds may extend radially from axis (52).

Figure 8A:
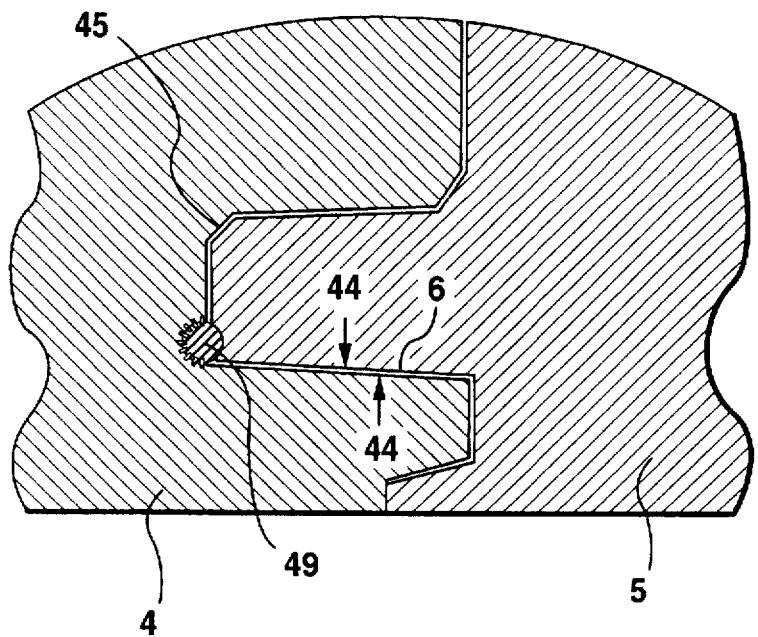
FIG. 8A is a cross sectional view of a bonding area design which incorporates an integral seal.
Figure 8B:
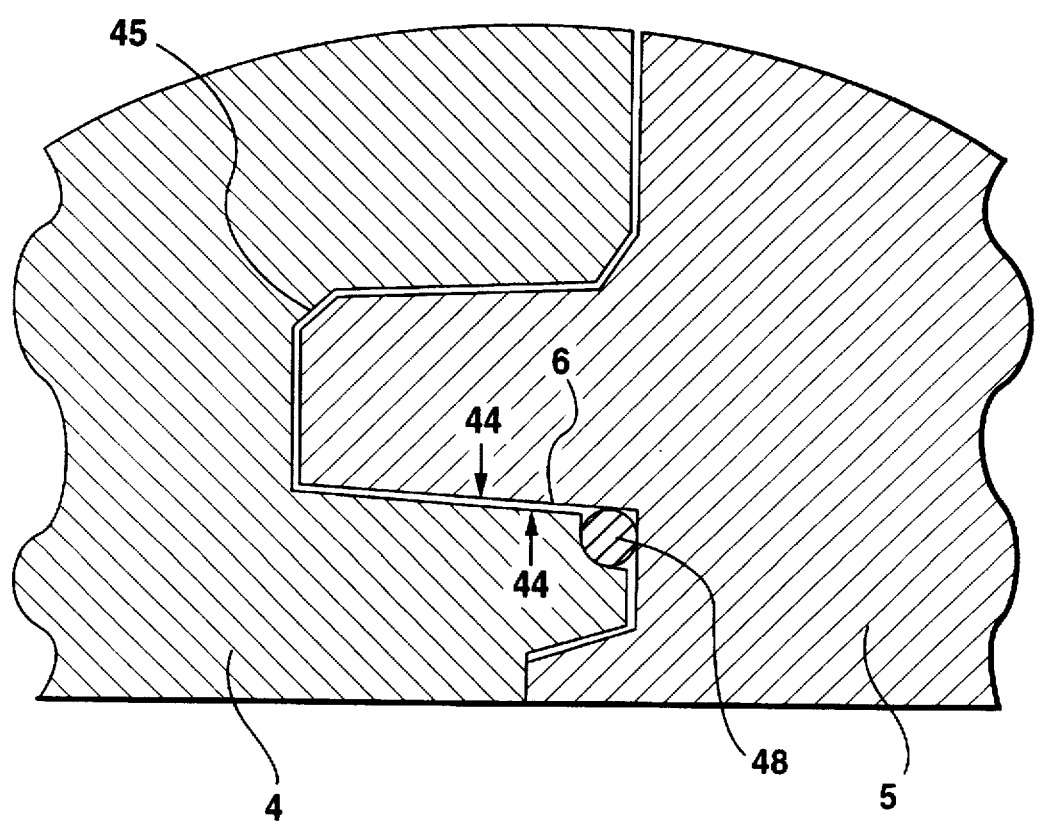
FIG. 8B is a cross sectional view of a bonding area design which incorporates a separate seal.

Another aspect which allows the enhanced bonding strength for the designs shown is the fact that some compression means can be used to allow the surfaces to be pressed together perpendicular to the bond areas. As shown in FIGS. 8A and 8B, this compression means can include an angled surface (45) (separate or integral), a taper (46) as shown in FIG. 6, or some other type of design. This is remarkable because at first glance it would seem difficult or even impossible to create compression forces which are parallel to central plane (3). These compression forces (44) can act so as to merge two bonding surfaces together perpendicular to the force applied in assembling first molded portion (4) and second molded portion (5). Thus, while first and second molded portions are forced together in a direction parallel to the central axis (2) (and perpendicular to the central plane (3)), the design results in a transformation of the assembly force to a force perpendicular to the bonding surface—compressive force (44). As shown, it should also be understood that angled surface (45) can be oriented so as to urge the bonding surfaces toward each other only after substantial insertion has occurred so as to avoid displacing any bonding solvent, cement, or other such material.

Yet another aspect shown in FIGS. 8A and 8B is the fact that a seal such as rim bond seal (48) may be included in order to allow first molded portion (4) and second molded portion (5) to be joined in a substantially airtight fashion. This can be important if tubeless tires are used. As shown in FIG. 8B this may include a separate seal which is substantially air impervious such as rim bond seal (48). This may be simply an O-ring or some other more specific design. The seal may also be an integral seal as shown in FIG. 8A. This integral seal (49) may be molded into one part as shown in FIG. 8A. Any type of seal may also exist at only the bottom at the recess if desired.

Figure 9:
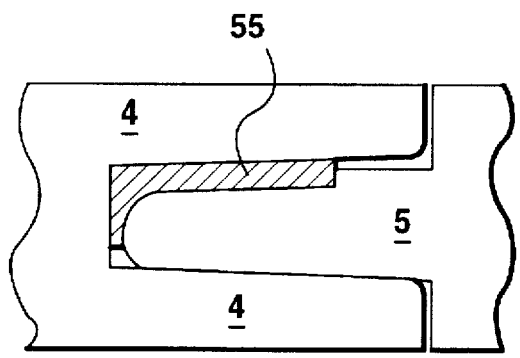
FIG. 9 is a cross sectional view of a bonding area design which is adapted to the utilization of an electromagnetically active material for bonding purposes.

As mentioned earlier, a variety of bonding techniques can be utilized. This may include electromagnetic welding, solvent bonding, cement bonding, adhesive bonding, frictional bonding, ultrasonic radiation bonding, and other types of techniques as well. With respect to the use of electromagnetically active material for electromagnetic welding, it may be understood with reference to FIG. 9 where electromagnetically active material (55) may be included within the bond area. After initial assembly the entire assembly may be subjected to electromagnetic radiation which activates the material and thus causes localized heating at the location of shear bond (6). This may afford the additional advantage of allowing substantially complete assembly to occur and allowing the compressive force (44) to exist prior to activating the electromagnetically active material if various aspects of the invention are combined. It may also act to seal the parts against air leakage.

Figure 10:
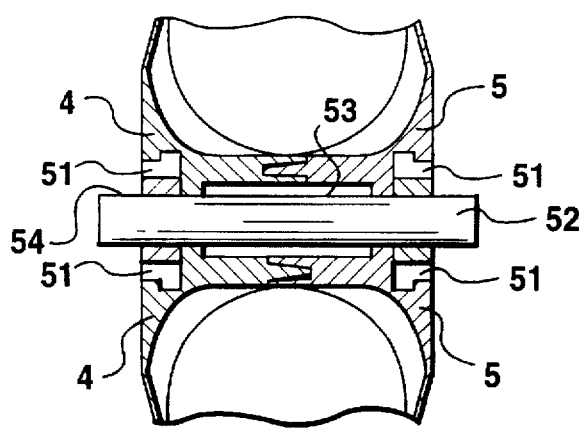
FIG. 10 is a cross sectional view of a hub portion design which incorporates an integral bearing.

As shown in FIGS. 10, 11, 11A, and 11B, additional manufacturing and assembly efficiency may also be achieved by creating a design which includes an integral bearing (51), integral race (47), a-pressed in bearing, or even integral bearing material. Such bearing arrangements include a great variety of designs including, integral material molded into the part, integral material molded into the axle, or even the proper selection of materials for the part and/or axle so as to exhibit low friction. As shown in FIG. 10, the integral bearing (51) may be situated so as to have an axial relationship with respect to hub portion (32) and axle (52) about the axle's outer surface area (53) so as to be exposed to axle along an axle interface (54). In some designs, a bearing component such as integral race (47) may be inserted prior to molding both first molded portion (4) and second molded portion (5) to make that component integral to the design. The remaining components (such as the ballbearings) can be added later. When the bearing is actually a separate material that is molded within first and second molded portions (4) and (5), it may also be appropriate to have this bearing exposed to a significant amount of the axle interface, the word "significant" being defined as an amount which allows sufficiently free rotation of axle (52) within the wheel.

Figure 11:
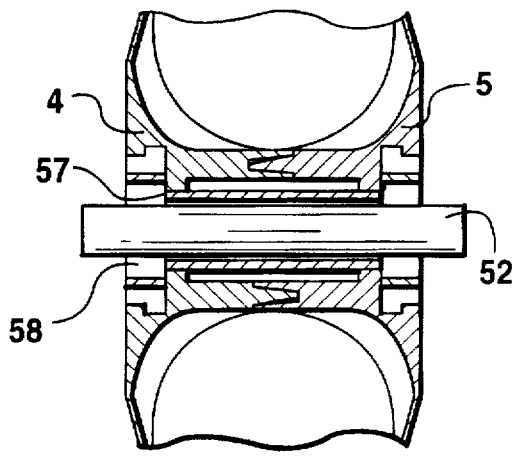
FIG. 11 is a cross sectional view of a hub portion design which incorporates an integral bearing and a separate spacer.
Figure 11A:
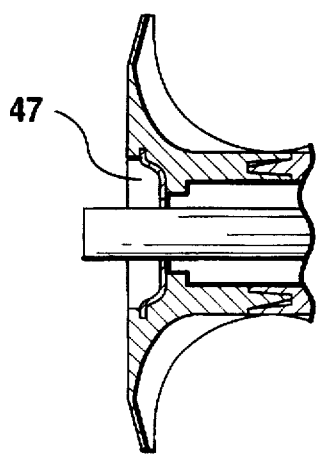
FIG. 11A is a cross sectional view of one side of a hub portion design which incorporates an integral bearing race.
Figure 11B:
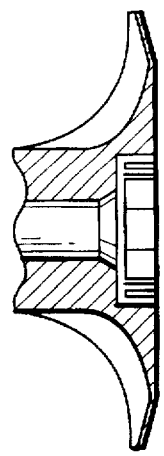
FIG. 11B is a cross sectional view of one side of a hub portion design which incorporates a pressed-in bearing.

Since it may be desirable to make the wheel as hollow as possible for weight savings, it may be desirable to include a spacer in the vicinity of hub portion (32). This is shown in FIGS. 11 and 11A where spacer (57) may be incorporated in the vicinity of axle (52) or axle hole (58). This spacer may create a pre-established width which is maintained regardless of the amount of tension caused through tightening of the nuts on axle (52). It may be positioned so as to maintain the spacing and bear the load in the vicinity of the axle hole (58) and thus may be positioned directly between the left and right end of axle hole (58). Since spacer (57) may experience higher forces than other parts, it may be made of a more expensive, stronger material. Naturally, it may also be integral to the design as shown in FIG. 10.

Figure 12:
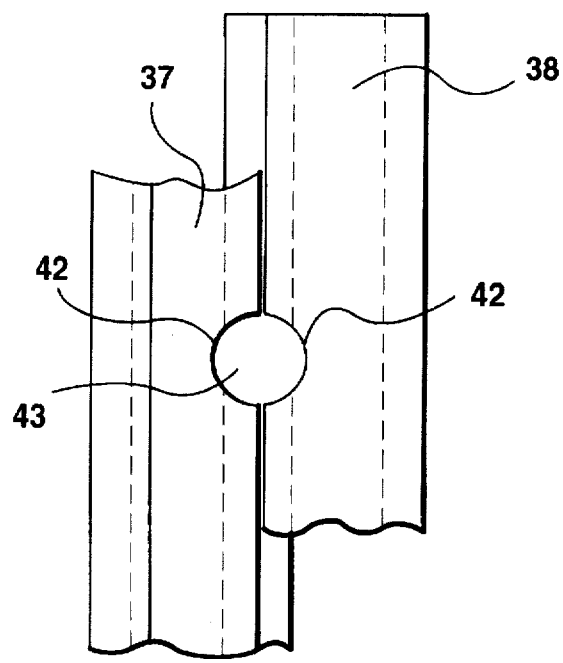
FIG. 12 is a top view of part of the rim portion of an assembled wheel which incorporates a molded hole feature.

As another manufacturing advantage, a valve stem or other hole can be molded into the design in the center of the rim. FIG. 12 shows how first rim portion (37) and second rim portion (38) may each have a semicircular boundary (42) about each of their inner rim surfaces. These semicircular boundaries may be located along the rim portion at a location (such as along folding line (22) shown in FIGS. 5 and 15A–C) so as to form a single hole (43) when the two parts are assembled. By choosing locations which correspond after the parts have been aligned for assembly, it may be easily understood how this type of molded design allows assembly of a hole (43) without any need for drilling or the like. As those having ordinary skill in the art would understand, the actual shape of the hole or opening may be varied. Thus, the term "semicircular" is herein defined to encompass any shape, be it square, oval, or otherwise.

Figure 13:
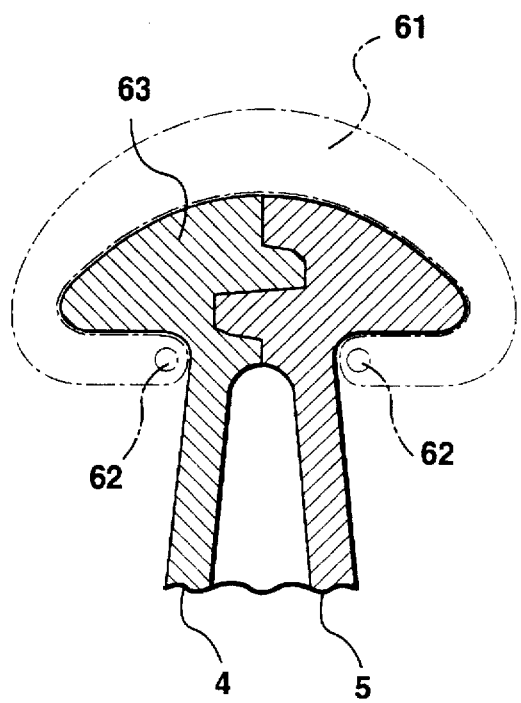
FIG. 13 is a cross sectional view of an assembled rim portion of a design which is adapted to a foam tire application.
Figure 14:
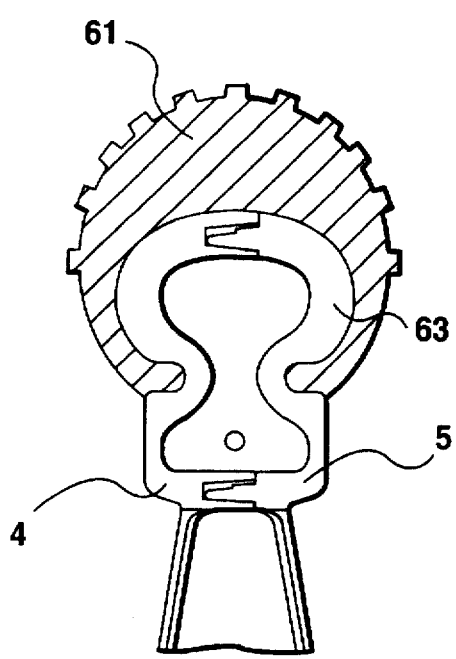
FIG. 14 is a cross sectional view of an assembled rim portion of another design which is adapted to a foam tire application.
Figure 15A:
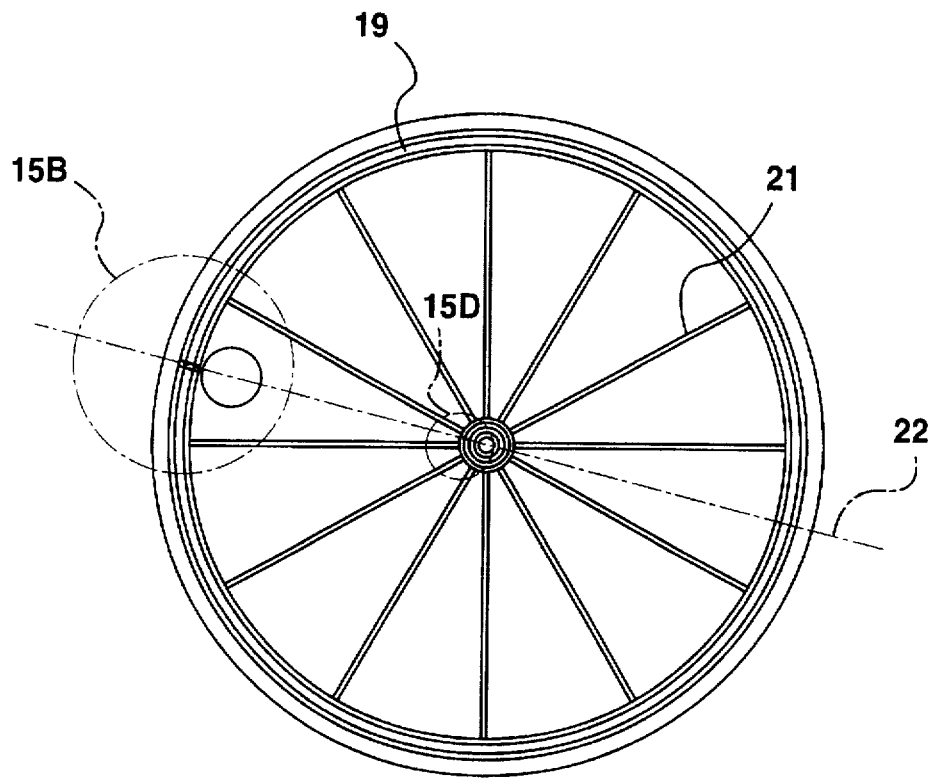
FIG. 15A is a back view of a reinforced disc design.
Figure 15B:
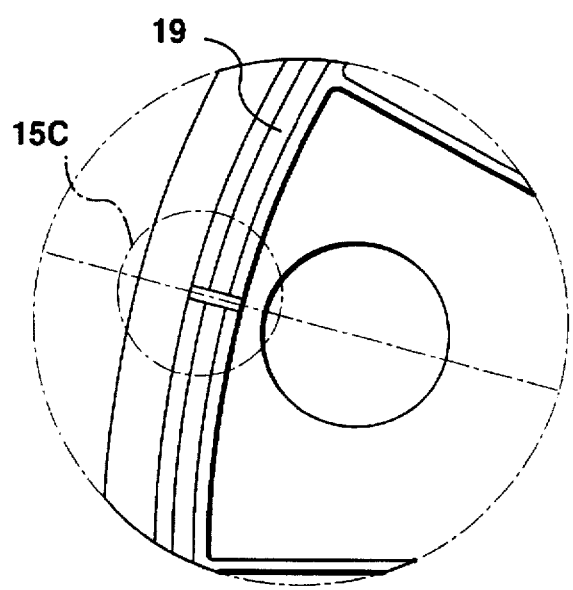
FIG. 15B is an expanded view of the valve stem area of the reinforced disc design shown in FIG. 15A.
Figure 15C:
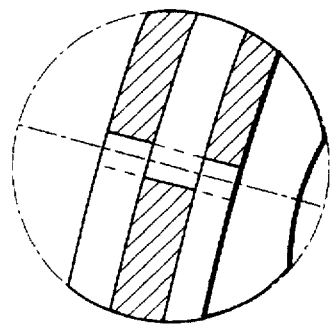
FIG. 15C is a further expanded detail of the valve stem area of the reinforced disc design shown in FIG. 15B showing the symmetrically opposite aspect about a folding line through the center of the valve stem hole.
Figure 15D:
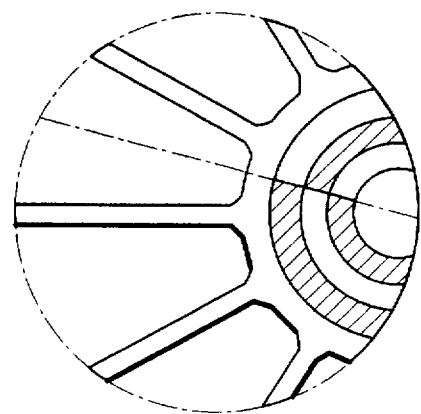
FIG. 15D is an expanded detail of the hub portion of the reinforced disc design shown in FIG. 15A showing the symmetrically opposite aspect about a folding line through the center of the hub portion.
Figure 15E:
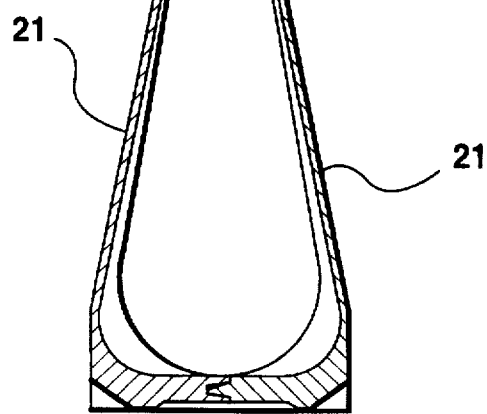
FIG. 15E is a cross sectional view of an assembled reinforced disc design as shown in FIG. 15A showing the internal rib feature.

Yet another aspect which might be achieved through the present design is the ability to be configured to accommodate foam tires. As shown in FIGS. 13 and 14, it can be understood how foam tire (61) might be accommodated through a design which might include an internal support (63). This can be very advantageous as at present the materials such as polyurethane and the like which are used for foam tires are fairly expensive. Through the proposed designs, such expense can be minimized by using inexpensive molded material. In addition, not only can more appropriate support be created for such tires, the tires may even be shaped in a more desirable fashion than that typically used for conventional wheel tire designs. Naturally, some type of fastener (62) can also be incorporated to hold foam tire (61) on the wheel assembly as well. The design of internal support (63) may also be arranged so as to allow, desired shock absorption characteristics by varying the shape orientation and/or thickness of internal support (63) along its length.

It should also be understood that other designs may also incorporate integral cosmetics and the like which may be molded into the wheel to further enhance manufacturing and assembly efficiency as well as to enhance the durability of the visual aspect of the product.

The foregoing discussion and the claims which follow describe the preferred embodiments of the present invention. Particularly with respect to the claims, it should be understood that changes can be made without departing from the essence of the invention. In this regard, it is intended that such changes still fall within the scope of the present patent. It is simply not practical to describe and claim all possible revisions to the present invention which may be accomplished. To the extent such revisions utilize the essence of the present invention each would naturally fall within the breath of protection encompassed by this patent. This is particularly true for the present invention since its basic concepts and understandings are fundamental in nature and can be broadly applied to a host of fields.

I claim:

1. A molded wheel assembly having a central axis perpendicular to a central plane comprising:
    a. a first molded portion comprising a solid first rim portion wherein said first rim portion comprises:
        i. an upper flange;
        ii. a middle recess below said upper flange; and
        iii. a lower flange below said middle recess
        wherein said upper flange and said middle recess and said lower flange form a solid first rim portion;
    b. a second molded portion comprising a solid second rim portion wherein said second rim portion comprises:
        i. an upper flanidng offset recess face;
        ii. a middle flange below said upper offset recess face; and
        iii. a lower flanking offset recess face below said middle flange
        wherein said upper flanking offset recess face and said middle flange and said lower flanking offset recess face form a solid second rim portion and wherein said upper flanking offset recess face is offset with respect to a central plane from said lower flanking offset recess face by a distance;
    c. at least one perpendicular shear bond having a bond width substantially perpendicular to said central plane which joins said first and second portions together to form wherein said shear bond is substantially perpendicular to said central plane said shear bond comprising:
        i. an airtight rim shear bond integral to said first and second rim portions of said first and second molded portions; and
        ii. an engaged area formed by said middle recess of said first molded section engaged with some portion of said middle flange of said second molded portion between said upper and lower flanking offset recess faces
        wherein said airtight rim shear bond and said engaged area form a solid bonded rim portion.

2. A molded wheel assembly as described in claim 1 wherein said molded wheel assembly defines a width at every point and wherein said perpendicular shear bond has a total width which is greater than the width of the molded wheel assembly in the vicinity of said perpendicular shear bond.

3. A molded wheel assembly as described in claim 1 wherein said perpendicular shear bond extends across said central plane.

4. A molded wheel assembly as described in claim 1 wherein said first and second molded portion are identical.

5. A molded wheel assembly as described in claim 1 wherein said first and second molded portions have inner surfaces defining a folding line, and wherein said inner surfaces are symmetrically opposite images about said folding line.

6. A molded wheel assembly as described in claim 5 and further comprising a compression means to compress a portion of one of said molded portions into a portion of the other said molded portion and which acts with a force parallel to said central plane.

7. A molded wheel assembly as described in claim 5 wherein said middle flange acts with a force parallel to said central plane when said first molded portion and said second molded portion are joined.

8. A molded wheel assembly as described in claim 1 wherein said first and second molded portions each comprise a hub portion on said central axis and a hub bond oriented along said hub portion.

9. A molded wheel assembly as described in claim 8 wherein said molded wheel assembly has a plurality of spoke portions extending radially from said hub portion to said bonded rim portion and wherein said perpendicular shear bond further comprises a perpendicular spoke bond oriented along said spoke portions.

10. A molded wheel assembly as described in claim 1 wherein said first and second rim portions each comprise:
    1) an inner rim surface;
    2) an outer rim surface which is further from said central axis than said inner rim surface;
    3) an interior surface; and
    4) a semicircular boundary extending from said outer rim surface to said inner rim surface at one location along said interior surface; and wherein the location of the semicircular boundary of said second rim portion corresponds to the location of the semicircular boundary of said first rim portion so as to form a single hole when said first and second rim portions are joined.

11. A molded wheel assembly as described in claim 1 and further comprising a compression means to compress a portion of one of said molded portions into a portion of the other said molded portion and which acts with a force parallel to said central plane.

12. A molded wheel assembly as in claim 11 wherein said compression means is integral to at least one of said molded portions.

13. A molded wheel assembly as described in claim 12 and further comprising:
   a. a first bonding surface on said first molded portion oriented substantially perpendicular to said central plane;
   b. a second bonding surface on said second molded portion oriented substantially perpendicular to said central plane; and
   c. a taper oriented so as to urge said first and second bonding surfaces toward each other when said first and second molded portions are joined together.

14. A molded wheel assembly as described in claim 11 wherein said compression means comprises an angled surface which is angled with respect to said central plane.

15. A molded wheel assembly as described in claim 1 wherein said middle flange acts with a force parallel to said central plane when said first molded portion and said second molded portion are joined.

16. A molded wheel assembly as described in claim 1 wherein said molded wheel assembly has a hub portion centered on said central axis and comprising:
   a. a hub bond which joins said first and second portions together, wherein said hub bond is substantially perpendicular to the central plane;
   b. an axle centered on said central axis wherein said hub portion and said axle form an axle interface; and
   c. an integral bearing wherein said integral bearing is exposed to said axle along a significant amount of said axle interface.

17. A molded wheel assembly as described in claim 16 wherein said integral bearing is a molded bearing in said hub portion.

18. A molded wheel assembly as described in claim 16 wherein said integral bearing is integral to said axle.

19. A molded wheel assembly as described in claim 1 and further comprising an electromagnetically active material in the vicinity of said perpendicular shear bond.

20. A molded wheel assembly as described in claim 1 wherein said molded wheel assembly has a hollow hub portion centered on said central axis and having a pre-established width and wherein said hollow hub portion comprises a spacer which maintains said hollow hub portion at said pre-established width.

21. A molded wheel assembly as described in claim 20 wherein said spacer is integral to said hollow hub portion.

22. A molded wheel assembly as described in claim 20 wherein said hollow hub portion has an axle hole having left and right ends and wherein said spacer is positioned in the vicinity of said axle hole directly from said left end to said right end. location along said interior surface;

* * * * *